United States Patent
Holl et al.

(10) Patent No.: US 9,373,865 B2
(45) Date of Patent: Jun. 21, 2016

(54) METHOD AND DEVICE FOR PRODUCING ELECTRODE WINDINGS

(75) Inventors: Konrad Holl, Aalen (DE); Markus Pompetzki, Aalen (DE); Robert Sekler, Ellwangen-Rattstadt (DE); Heiner Stelzig, Rosenberg (DE); Stefan Stock, Rainau (DE)

(73) Assignee: VW-VM Forschungsgesellschaft mbH & Co. KG (DE)

( * ) Notice: Subject to any disclaimer, the term of this patent is extended or adjusted under 35 U.S.C. 154(b) by 294 days.

(21) Appl. No.: 14/115,185

(22) PCT Filed: Apr. 27, 2012

(86) PCT No.: PCT/EP2012/057824
§ 371 (c)(1),
(2), (4) Date: Nov. 1, 2013

(87) PCT Pub. No.: WO2012/150194
PCT Pub. Date: Nov. 8, 2012

(65) Prior Publication Data
US 2014/0053383 A1     Feb. 27, 2014

(30) Foreign Application Priority Data
May 2, 2011   (DE) .......................... 10 2011 075 063

(51) Int. Cl.
*H01G 7/00*   (2006.01)
*H01M 10/04*  (2006.01)
(Continued)

(52) U.S. Cl.
CPC ......... *H01M 10/0431* (2013.01); *B23K 26/032* (2013.01); *B23K 26/0838* (2013.01);
(Continued)

(58) Field of Classification Search
CPC ............ H01M 10/04; H01M 10/0409; H01M 10/043; H01M 10/0587; H01G 9/008; H01G 11/76; H01G 13/02; Y10T 29/417; Y10T 29/49108
USPC ............. 29/25.51, 603.23, 605, 623.1, 623.3; 429/94, 211, 234
See application file for complete search history.

(56) References Cited

U.S. PATENT DOCUMENTS

| 5,250,784 A | 10/1993 | Muller et al. |
| 6,337,758 B1 | 1/2002 | Beteille et al. |

(Continued)

FOREIGN PATENT DOCUMENTS

| CN | 1387683 | 2/2002 |
| DE | 100 20 031 A1 | 11/2001 |

(Continued)

OTHER PUBLICATIONS

The Official Action issued by the German Patent Office on Jan. 10, 2012 in corresponding German Application No. 10 2011 075 063.0.

*Primary Examiner* — Paul D Kim
(74) *Attorney, Agent, or Firm* — DLA Piper LLP (US)

(57) ABSTRACT

A method produces electrode windings, in which method a strip- or ribbon-like anode and a strip- or ribbon-like cathode are provided and flat collector lugs are formed on at least one longitudinal side of the anode and of the cathode at varying distances and/or contours are cut into the longitudinal sides of the electrodes. The anode and the cathode are wound up together with a strip- or ribbon-like separator to form a winding with the sequence anode/separator/cathode. The method is distinguished, in particular, in that the process of forming collector lugs and/or of cutting contours and the process of winding up overlap with respect to time.

7 Claims, 3 Drawing Sheets

(51) Int. Cl.
  *B23K 26/03* (2006.01)
  *B23K 26/08* (2014.01)
  *B23K 26/38* (2014.01)
  *H01G 9/008* (2006.01)
  *H01G 11/76* (2013.01)
  *H01G 13/02* (2006.01)
  *H01M 10/0587* (2010.01)

(52) U.S. Cl.
  CPC ............. *B23K26/38* (2013.01); *H01G 9/008* (2013.01); *H01G 11/76* (2013.01); *H01G 13/02* (2013.01); *H01M 10/0409* (2013.01); *B23K 2201/34* (2013.01); *B23K 2201/38* (2013.01); *H01M 10/0587* (2013.01); *Y02E 60/13* (2013.01); *Y10T 29/43* (2015.01); *Y10T 29/49112* (2015.01); *Y10T 29/53013* (2015.01)

(56) References Cited

U.S. PATENT DOCUMENTS

| | | | |
|---|---|---|---|
| 6,534,952 B1 | 3/2003 | Ishikawa et al. | |
| 6,746,796 B2* | 6/2004 | Watanabe | H01M 2/263 29/623.1 |
| 6,967,828 B2* | 11/2005 | Miltich | H01G 9/022 361/508 |
| 6,995,971 B2* | 2/2006 | Norton | H01G 9/02 29/25.03 |
| 7,875,087 B2* | 1/2011 | Norton | H01G 9/02 29/25.03 |
| 8,974,955 B2* | 3/2015 | Min | H01M 2/021 429/162 |
| 2004/0029008 A1 | 2/2004 | Winterberg et al. | |
| 2006/0123609 A1* | 6/2006 | Norton | H01G 9/02 29/25.03 |
| 2006/0194108 A1 | 8/2006 | Drews et al. | |
| 2009/0239133 A1 | 9/2009 | Kosugi | |
| 2010/0124694 A1* | 5/2010 | Hikata | B26F 1/384 429/94 |
| 2010/0281685 A1 | 11/2010 | Hori et al. | |
| 2013/0252054 A1* | 9/2013 | Barone | H01M 2/263 429/94 |

FOREIGN PATENT DOCUMENTS

| | | |
|---|---|---|
| DE | 101 18 639 A1 | 10/2002 |
| DE | 10 2007 019 663 A1 | 10/2008 |
| EP | 0 277 761 A2 | 8/1988 |
| EP | 0 465 628 B1 | 11/1994 |
| EP | 1 691 432 A2 | 8/2006 |
| EP | 1 012 662 B1 | 1/2010 |
| EP | 2 254 176 A1 | 11/2010 |
| JP | 2000-012390 | 1/2000 |

* cited by examiner

METHOD AND DEVICE FOR PRODUCING ELECTRODE WINDINGS

TECHNICAL FIELD

This disclosure relates to a method of producing electrode windings and to a device which carries out the method.

BACKGROUND

The term "battery" originally meant a plurality of electrochemical cells connected in series in a housing. However, single electrochemical cells are nowadays frequently also referred to as batteries. During the discharge of an electrochemical cell, an energy-supplying chemical reaction which is made up of two electrically coupled but physically separate subreactions takes place. In an oxidation process, electrons are liberated at the negative electrode, resulting in flow of electrons via an external load to the positive electrode which takes up a corresponding quantity of electrons. A reduction process therefore takes place at the positive electrode. At the same time, an ion current corresponding to the electrode reaction occurs within the cell. This ion current is ensured by an ionically conductive electrolyte. In secondary cells and batteries, this discharge reaction is reversible. It is therefore possible to reverse the transformation of chemical energy into electrical energy which occurs during discharge. If the terms "anode" and "cathode" are used in this context, the electrodes are generally named according to their discharge function. In such cells, the negative electrode is therefore the anode, and the positive electrode is the cathode.

Similarly to secondary cells and batteries, capacitors can also store electrical energy in a reversible manner, however not in chemical form but rather in an electric field between two electrically conductive surfaces, the capacitor electrodes, which are usually arranged at a short distance from one another. Since electrical charge in a capacitor is not initially liberated or stored as a result of a chemical reaction, it can be taken up and released again very quickly. For this reason, the energy density of a capacitor is generally very clearly below that of a battery.

From among the known secondary cells and batteries, comparatively high energy densities are achieved by lithium-ion batteries in particular. In many cases, lithium-ion batteries contain a cell stack made up of a plurality of single cells. However, cells and batteries with high capacitance in particular are often constructed as winding cells which have strip- or ribbon-like electrodes in wound form (electrode windings). This is also the preferred design of capacitors.

Secondary cells and batteries and also capacitors with a winding structure usually have a wound composite comprising flat electrodes and separators in the sequence positive electrode/separator/negative electrode. In the case of secondary cells and batteries, the electrodes usually comprise metal current collectors and also electrochemically active components and electrochemically inactive components. Electrochemically active components (often also called active materials) for secondary lithium-ion batteries include all materials which can take up lithium ions and release them again. The prior art in this respect for the negative electrodes are, in particular, particles based on carbon such as graphitic carbon or non-graphitic carbon materials which are capable of intercalating lithium. Furthermore, it is also possible to use metallic and semimetallic materials which can be alloyed with lithium or composites of such materials with, for example, carbon-based materials. Lithium metal oxide compounds and lithium metal phosphate compounds such as $LiCoO_2$ and $LiFePO_4$ in particular can be used for positive electrodes. As electrochemically inactive components, mention may be made first and foremost of electrode binders and the mentioned current collectors. Electrons are supplied to or discharged from the electrodes via current collectors. Electrode binders ensure mechanical stability of the electrodes and that the particles comprising electrochemically active material contact one another and the current collector. Microporous plastic films in particular can be used as separators.

In the case of capacitors, the electrodes are usually electrically conductive substrates such as metals. A non-electrically conductive nonwoven, a porous plastic film (for example, polyethylene) or a non-electrically conductive porous ceramic layer (for example, aluminum oxide), for example, can serve as a separator.

To produce electrodes for secondary batteries and cells, pastes comprising the mentioned electrochemically active and inactive components are applied to the electrical collectors in the form of thin layers, dried and converted into the desired fitting shape. The layers are usually then rolled and pressed and possibly then combined with separators and counterelectrodes. However, problems may arise in the process, particularly when producing winding cells.

Current is discharged from electrode windings by collector lugs. When producing electrode windings, it is generally customary to provide the strip- or ribbon-like electrodes, which are to be wound, with a plurality of, preferably a large number of, collector lugs to subject the electrodes to loading in as uniform a manner as possible during charging and discharging. Accordingly, it is customary to provide collector lugs distributed over the entire length of an electrode strip to be wound. In the finished winding, these collector lugs usually protrude from the winding at the end face. In that case, collector lugs of the same polarity should be grouped, in particular such that they overlap in a stack-like arrangement so that they can be connected to one another as easily as possible, for example, by welding. So that a grouping of this kind is obtained and the collector lugs, for example, in spiral windings are not, for example, radially distributed in a more or less random manner, it is necessary to take into account that the radius of an electrode winding increases in the outward direction with each turn of the winding. If collector lugs are arranged at uniform distances on the longitudinal side or sides of an electrode strip, this leads to a radial offset of the collector lugs in the winding.

In practice, this problem is dealt with by the distances between adjacent collector lugs along the electrode strip to be wound being allowed to increase in the direction of that end of the strip on the outside of the winding. The required distances can be calculated in a very simple manner by taking into account the thickness of the electrodes. However, fluctuations in the thickness in the longitudinal direction occur particularly in the case of the electrodes of secondary batteries and cells within certain tolerances. Given a minimum thickness fluctuation of +/−1 μm, the resulting offset in a winding cell with more than 100 turns can already be several millimeters.

SUMMARY

We provide a method of producing electrode windings including (A) providing at least one strip- or ribbon-like anode, (B) forming flat negative collector lugs at varying distances on at least one longitudinal side of the at least one anode and/or cutting a contour into at least one longitudinal side of the at least one anode, (C) providing at least one strip- or ribbon-like cathode, (D) forming flat positive collector lugs at varying distances on at least one longitudinal side of the at least one cathode and/or cutting a contour into at least one longitudinal side of the at least one cathode, (E) providing at least one strip- or ribbon-like separator, (F) optionally, cutting a contour into at least one longitudinal side of the at least one separator, and (G) winding up the at least one anode, the at least one cathode and the at least one separator to form a winding with the sequence anode/separator/cathode, wherein (G) and at least one of (B) or (D) and, optionally, (F) overlap with respect to time.

We also provide a device that carries out the method, including means for providing at least one strip- or ribbon-like anode, means for forming flat negative collector lugs at varying distances on at least one longitudinal side of the at least one anode and/or means for cutting a contour into at least one longitudinal side of the at least one anode, means for providing at least one strip- or ribbon-like cathode, means for forming flat positive collector lugs at varying distances on at least one longitudinal side of the at least one cathode and/or means for cutting a contour into at least one longitudinal side of the at least one cathode, means for providing at least one strip- or ribbon-like separator, optionally, means for cutting a contour into at least one longitudinal side of the at least one separator, and means for winding up the at least one anode, the at least one cathode and the at least one separator to form a winding with the sequence anode/separator/cathode, at least one sensor that determines at least one of the parameters comprising relative positioning of the positive collector lugs in relation to one another, relative positioning of the negative collector lugs in relation to one another, relative positioning of the positive collector lugs in relation to the negative collector lugs, relative positioning of the at least one cathode in relation to the at least one anode, relative positioning of the at least one separator in relation to the at least one cathode and/or in relation to the at least one anode, thickness and/or geometries of the at least one anode, thickness and/or geometric profile of the at least one anode in the longitudinal direction, thickness and/or geometry of the at least one cathode, thickness and/or geometric profile of the at least one cathode in the longitudinal direction, and thickness and/or geometry of the at least one separator, thickness and/or geometric profile of the at least one separator in the longitudinal direction, and a data-processing and control device that detects measurement results of the at least one sensor and, depending on said measurement results, prespecifies, to the means for forming the flat collector lugs, distances or a variation in the distances between the collector lugs on the at least one longitudinal side of the at least one cathode and/or of the at least one anode and/or supplies a corrected prespecified contour value to the means for cutting the contour into the at least one longitudinal side of the at least one cathode, of the at least one anode and/or of the at least one separator.

DETAILED DESCRIPTION

Figure 1:
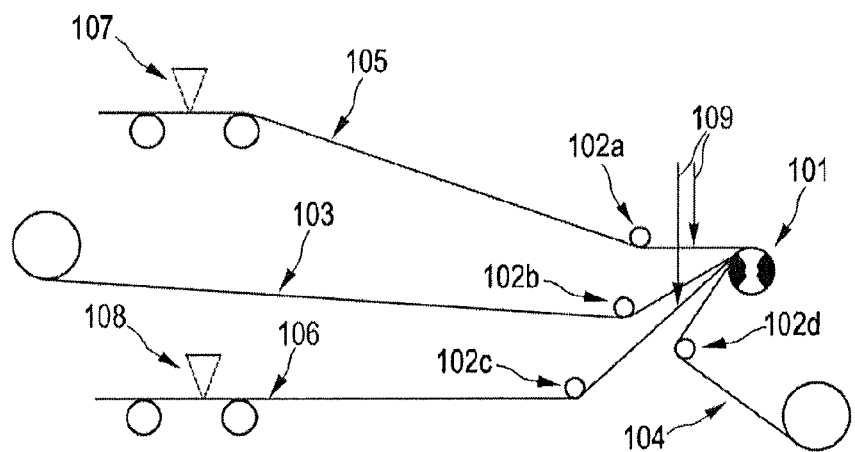
FIG. 1 schematically shows portions of a device that produces electrode windings.

We provide a method of producing electrode windings, which method comprises at least the following steps:

At least one strip- or ribbon-like anode is provided in a step A.

Flat negative collector lugs are formed at varying distances on at least one longitudinal side of the at least one anode in a step B. As an alternative or in addition, a contour can also be cut into at least one longitudinal side of the at least one anode in this step.

At least one strip- or ribbon-like cathode is provided in a step C.

Flat positive collector lugs are formed at varying distances on at least one longitudinal side of the at least one cathode in a step D. As an alternative or in addition, a contour can also be cut into at least one longitudinal side of the at least one anode in this step.

At least one strip- or ribbon-like separator is provided in a step E.

A contour is optionally cut into at least one longitudinal side of the at least one separator in a step F.

The at least one anode, the at least one cathode and the at least one separator are wound up, in particular wound up in a spiral manner, to form a winding with the sequence anode/separator/cathode in a step G.

Steps A to E and G are necessarily constituent parts of the method. Step F is an optional step which plays a role primarily when producing asymmetrical electrode windings. However, this will be discussed in greater detail below.

Either the anode or the cathode, or even both electrodes, are usually covered on both sides by a separator to prevent short circuits during the winding up process. Therefore, two or more separators are preferably provided in step E, and then wound up in step G. It is also readily possible to produce sequences of the type anode/separator/cathode/separator/anode or cathode/separator/anode/separator/cathode.

Preferably, collector lugs can be formed on both longitudinal sides of the strip- or ribbon-like anode and/or of the strip- or ribbon-like cathode. In these cases, collector lugs of the same polarity protrude from the resulting electrode winding on opposite sides.

As is known, a strip or a ribbon is a flat article whose length exceeds its width by a multiple and which also preferably has a substantially uniform width substantially over its entire length. Accordingly, the terms "strip- or ribbon-like" are also herein to be understood in a corresponding manner. For example, the length of anodes, cathodes and separators which can be used is generally 0.25 m to 25 m, preferably 0.5 m to 15 m. Their maximum width is preferably 20 mm to 400 mm, preferably 40 mm to 200 mm.

Since the collector lugs are formed on the longitudinal sides of the electrodes and the electrodes are wound up in a flat manner in the longitudinal direction, the collector lugs usually protrude from the winding in the axial direction (in relation to the winding axis), that is to say in particular at the end face. The collector lugs themselves are not present in wound form. Strictly speaking, they are therefore not part of the winding, but rather serve only to make electrical contact with the winding. It is therefore possible to distinguish between a winding main body which comprises the wound electrodes and separators, and the non-wound collector lugs which protrude from the main body.

In line with the problem described above, it is preferred when the windings obtained in step F are windings in which the collector lugs which protrude from the winding are arranged in an overlapping manner in a kind of stack-like arrangement. As mentioned above, the collector lugs are flat, for example, rectangular or square, and they generally have two opposite flat sides which can be planar or, in particular in the case of spiral windings, even bent (one flat side is convex, the other is concave) in the finished winding. In this case, an overlapping arrangement is to be understood to mean, in particular, that the flat sides of all of the collector lugs within the stack-like arrangement overlap in one direction, preferably perpendicular to the flat sides, preferably over at least 75%, particularly preferably over at least 90%, in particular over at least 95%. Therefore, the collector lugs have only a minimum offset in relation to one another within the stack-like arrangement.

All of the collector lugs within a stack-like arrangement are preferably of the same size. However, this is not absolutely necessary.

The method is particularly distinguished in that step G and at least one of steps B or D, in particular both steps, and optionally also step F, overlap with respect to time. This means that an electrode strip or electrode ribbon is not, for example, first completed and then wound up in a subsequent, separate step. Rather, the method begins with the electrode strips and the at least one separator being processed to form a winding, before all of the collector lugs are formed along the at least one longitudinal side of the at least one anode and/or cathode and/or before the contour cut on the longitudinal sides of the electrodes and of the at least one separator is completed.

It is preferred when at least one of the parameters
  relative positioning of the positive collector lugs in relation to one another (in the electrode winding which is produced),
  relative positioning of the negative collector lugs in relation to one another (in the electrode winding which is produced),
  relative positioning of the positive collector lugs in relation to the negative collector lugs (in the electrode winding which is produced), relative positioning of the at least one cathode in relation to the at least one anode (in the electrode winding which is produced),
  relative positioning of the at least one separator in relation to the at least one cathode and/or in relation to the at least one anode (in the electrode winding which is produced),
  thickness and/or geometry of the at least one anode, in particular thickness and/or geometric profile of the at least one strip- or ribbon-like anode in the longitudinal direction,
  thickness and/or geometry of the at least one cathode, in particular thickness and/or geometric profile of the at least one strip- or ribbon-like cathode in the longitudinal direction, and
  thickness and/or geometry of the at least one separator, in particular thickness and/or geometric profile of the at least one strip- or ribbon-like separator in the longitudinal direction
is detected by at least one sensor and, depending on the measurement result,
  the distances between the collector lugs still to be formed in step B and/or step D are re-corrected
and/or
  the contours, which are to be cut, for the longitudinal sides of the electrodes and/or of the at least one separator are re-corrected.

The objective of the measurements is to identify at an early stage possible deviations from the calculated position of the collector lugs, of the electrodes and/or of the separators in the winding, in particular as a result of fluctuations in the thickness of the electrodes and/or separators, and to counteract the resulting offset arrangement of the collector lugs, electrodes and/or separators in the winding produced by accordingly correcting the position of the collector lugs which are still to be formed and/or the contours which are to be cut on the as yet non-wound portion of the anode, cathode or separator strip. The method is accordingly preferably a closed-loop control method and not an open-loop control method.

The collector lugs are preferably formed by a cutting process, in particular with the aid of at least one laser. Both the contours of electrodes and separators and also the collector lugs are therefore preferably cut out. The collector lugs are particularly preferably also cut out at the same time as the contours of the electrodes are cut.

To produce electrodes of batteries and battery cells, pastes comprising electrochemically active and inactive components are usually applied to electrical collectors in a coating process, dried and converted into the desired fitting shape. The latter step optionally also comprises cutting out the collector lugs. The collectors are usually provided in the form of continuous ribbons which, given central coating, have uncoated edge regions on the longitudinal sides, it being possible for the collector lugs to be cut out of said uncoated edge regions. Preferably, the edge contours of the anode and cathode are defined at the same time in the process.

Ribbon-like foils, lattices and nets composed of metal are generally used as collectors for battery electrodes. In particular, collectors composed of copper (on the anode side) and aluminum (on the cathode side) are preferred in the case of lithium-ion batteries.

Both the coated and the uncoated regions of the collectors can be readily cut using a laser. The use of lasers for cutting electrodes is already known, for example, from EP 465 628 B 1. In our method, more than one laser, preferably 2 to 8 lasers, are preferably used, it being possible for the collector lugs and the contours of the anode and cathode to be cut at the same time using the lasers.

Preferably, the collector lugs of electrodes for batteries are formed, in particular, by a cutting process from a collector at least partially covered with a paste comprising electrochemically active and inactive components. Collectors and collector lugs of the electrodes can therefore be integrally formed.

In principle, windings of any desired geometries can be obtained by cutting the longitudinal edges of the electrodes in a corresponding manner. The classic spiral winding has a cylindrical main body and therefore a very high degree of symmetry. However, depending on the application, it may be desired to produce flat, non-rotationally symmetrical windings with an oval turn profile or even windings which have a winding main body with a cross section which changes in the axial direction (asymmetrical windings). Particularly in the latter case, not only is the positioning of the collector lugs important, but the electrodes and separators must also have no offset in relation to one another in the winding. Accordingly, it is important to use the mentioned sensors to monitor the relative positioning of the at least one cathode in relation to the at least one anode and of the electrodes to the at least one separator in the electrode winding which is produced and, if required, to adapt the contours which are still to be cut.

The strip- or ribbon-like anode and the strip-or ribbon-like cathode can both be the electrodes of a battery cell and also the electrodes of a capacitor. Accordingly, the method can be used both to produce battery cells and also to produce capacitors. In terms of the material selection for the electrodes and also for suitable separators, reference is made in both cases to the information provided above.

We also provide a device that produces electrode windings, in particular in accordance with our method. A device of this kind comprises means for providing at least one strip- or ribbon-like anode,
means for providing at least one strip- or ribbon-like cathode,
means for providing at least one strip- or ribbon-like separator, and
means for winding up the at least one anode, the at least one cathode and the at least one separator to form a winding with the sequence anode/separator/cathode, wherein the means are generally a customary winding device that produces electrode windings and also suitable transportation devices that feed the winding device with ribbon-like electrodes and separators. The device further comprises means for forming flat negative collector lugs at varying distances on at least one longitudinal side of the at least one anode and/or means for cutting a contour into at least one longitudinal side of the at least one anode,
means for forming flat positive collector lugs at varying distances on at least one longitudinal side of the at least one cathode and/or means for cutting a contour into at least one longitudinal side of the at least one cathode, and also
optionally means for cutting a contour into at least one longitudinal side of the at least one separator.

In line with the above information in relation to the method the method preferably uses a cutting device/cutting means, in particular at least one laser.

The device is particularly distinguished in that it has at least one sensor that determines at least one of the parameters (see above) relevant in connection with identification of possible deviations from the calculated position of the collector lugs, of the electrodes and/or of the separators in the winding, in particular as a result of fluctuations in the thickness of the electrodes, and also a data-processing and control device which detects the measurement results of the at least one sensor and, depending on the measurement results, prespecifies, to the means for forming the flat collector lugs, corrections relating to the distances or the variation in the distances between the collector lugs which are still to be formed and/or supplies a corrected prespecified contour value to the means for cutting the contour into the at least one longitudinal side of the at least one cathode, of the at least one anode and/or of the at least one separator.

Winding electrodes for electrochemical cells or capacitors can be produced in virtually any desired format using the method and the device. The cutting means used are, particularly preferably, 4 to 8 lasers with which the at least one anode, the at least one cathode and the at least one separator can be simultaneously cut. With at least one mechanical or electronic measurement sensor on the winding device, the relative positions of electrodes and separators in the winding which is produced can be constantly checked and automatically re-corrected using a complex computer program. As a result, the above-described influences of fluctuations in the thickness of the electrodes on the positioning of the collector lugs, for example, can be virtually completely eliminated.

In practice, a cutting pattern which progressively changes in length is usually prespecified for each electrode and each separator with a position of the collector lugs which is calculated taking into account the winding extent and the average material thicknesses. The individual layers (electrodes and separators) are positioned virtually in relation to one another in the computer and then cut in accordance with the prespecified cutting pattern and wound up. In the process, positioning of the layers in relation to one another is continuously detected by sensors and, if required, automatically re-corrected simultaneously for all of the layers using a computer level which lies above the cutting pattern.

The lasers are particularly preferably operated in parallel and actuated by a complex machine program such that windings and collector lugs with virtually any desired geometries can be created. The cutting contour can be changed, for example, by running a graphics file, for example, in DXF format, or by drawing the cutting pattern directly onto the operator control surface of a system computer.

The device and the method will be explained in greater detail with reference to the drawings. At this point, it should be explicitly pointed out that all of the optional aspects of the device or of the method described herein can each be implemented by themselves or in combination with one or more of the further described optional aspects. The following description of preferred examples serves merely to explain and improve understanding and is not to be understood as being restrictive in any way.

FIG. 1 is a schematic illustration of the method. A winding device 101 is supplied with two ribbon-like separators 103 and 104 and also a ribbon-like anode 105 and a ribbon-like cathode 106 by the deflection rollers 102a to 102d. An electrode winding with the sequence separator/cathode/separator/anode is produced in this device 101. The longitudinal sides of the ribbon-like electrodes 105 and 106 are cut with the aid of the lasers 107 and 108. The abovementioned collector lugs are formed in the process. The positioning of the collector lugs is adjusted by sensors at point 109. The cutting patterns for the collector lugs which are still to be formed, in particular the distances of said collector lugs on the longitudinal side, are re-corrected if required.

Figure 2:
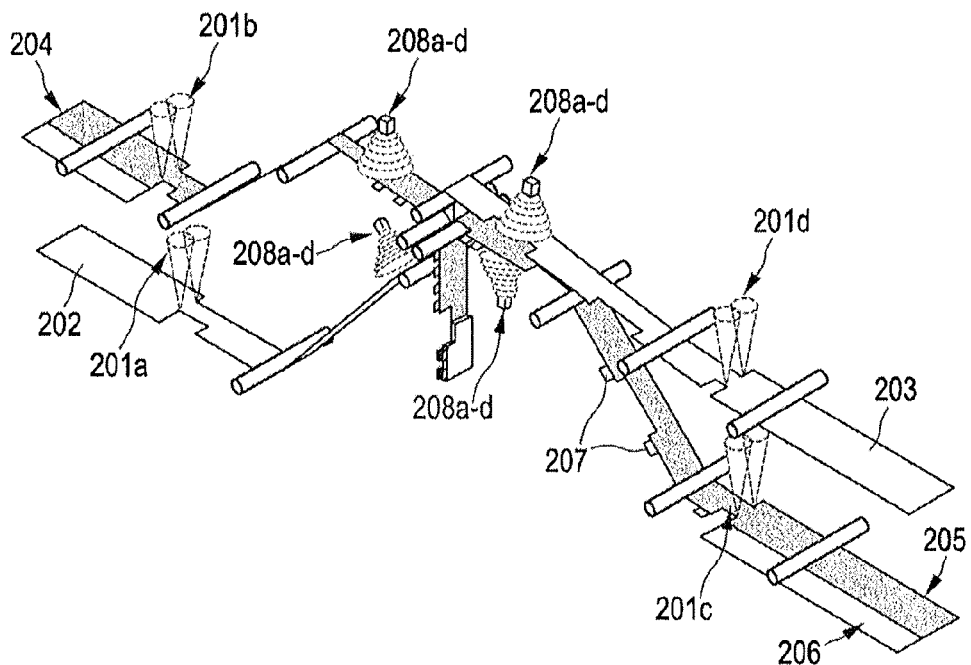
FIG. 2 schematically shows a cutting device with eight lasers.

A device having a total of eight lasers 201a to 201d to cut electrodes and separators is illustrated in FIG. 2. An electrode winding with the sequence separator 1/cathode/separator 2/anode is produced in this device. The two separators 202 and 203 and the two electrodes 204 and 205 are each provided in ribbon-like form. The longitudinal sides of the separators 202 and 203 and the electrodes 204 and 205 are cut using the lasers. Collector lugs 207 are formed from uncoated edge regions 206 of the electrodes in the process. At the same time, contours are cut into the longitudinal sides of the electrodes 204 and 205 and of the separators 202 and 203, as can be seen in FIGS. 4(A)-4(E). Electrode windings which have a winding main body with a cross section which changes in the axial direction (asymmetrical electrode windings) can be obtained from electrodes with contours of this kind. A cutting pattern is monitored using the sensors 208a-d, both the edge contours of the electrodes 204 and 205 and separators 202 and 203 and also the relative positioning of the collector lugs being checked in said monitoring process. If it is established during the examination that an offset is produced in the resulting winding, the prespecified cutting values for the lasers 201a to 201d will be re-corrected during operation.

Figure 3:
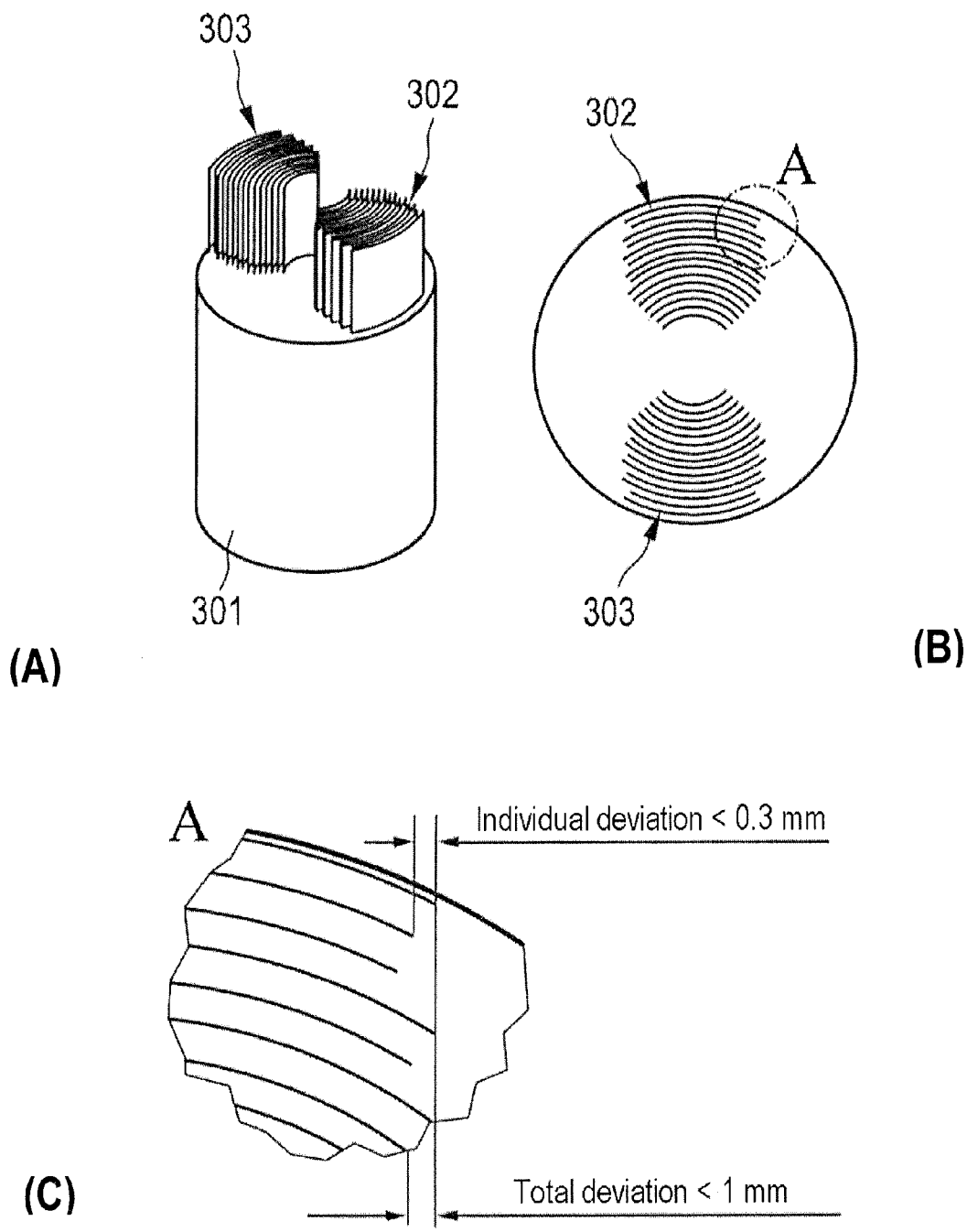
FIGS. 3(A)-3(C) schematically show varying portions of a cylindrical winding.

An electrode winding 300 comprising spirally wound electrodes and separators, as can be obtained with the method illustrated in FIG. 1, for example, is illustrated in FIG. 3(A). An overall illustration of the winding 300 with the cylindrical winding main body 301, formed from a spirally wound composite of electrodes and separators is shown. Two groups of collector lugs 302 and 303 protruding from the winding 300 at the end face are also shown in FIG. 3(B). A plan view of the winding 300 illustrated in FIG. 3(A), more precisely the end face of the winding 300 with the groups of collector lugs 302 and 303, is illustrated on the right-hand side, and an enlarged view of a detail "A" of the end face FIG. 3(B) is also shown in FIG. 3(C). It can clearly be seen that the individual collector lugs are arranged to overlap in the direction of the centre of the winding 300. The collector lugs form a kind of stack within which individual collector lugs and adjacent collector lugs fully overlap. The enlarged view of a detail shows that the individual collector lugs have only a minimum radial offset in relation to one another. Such precise results can be obtained without problems with the aid of the method.

Figure 4:
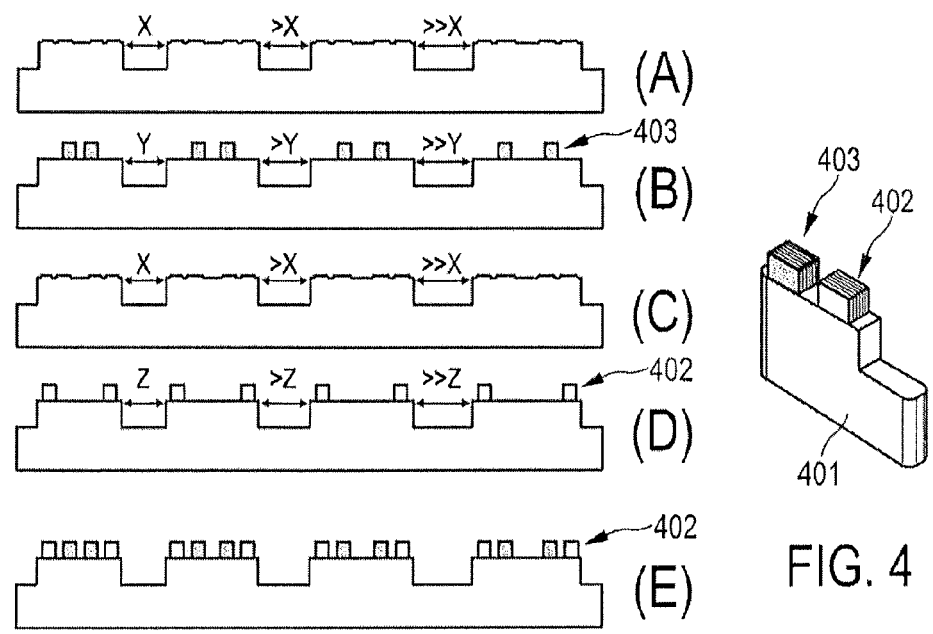
FIGS. 4(A)-4(E) schematically show front elevational views of various windings.

The electrode winding 400 with the winding main body 401 and also with the positive collectors 402 and the negative collectors 403 is illustrated in FIGS. 4(A)-4(C). As already mentioned, the winding main body 401 has a cross section which changes in the axial direction. A winding of this kind can be produced from the ribbon-like separators A and C and the ribbon-like electrodes B and D. Fragments of ribbons after the contour cut, for example, by lasers of a device according to FIG. 2, are illustrated in each case. The distances X, Y and Z which increase from left to right in the separators and electrodes A to D are emphasized. This increase is necessary to compensate for the increasing winding radius when the illustrated ribbon-like electrodes and separators are wound up starting from the left-hand side. E illustrates a composite comprising the electrodes and separators A to D which has not yet been wound.

Figure 5:
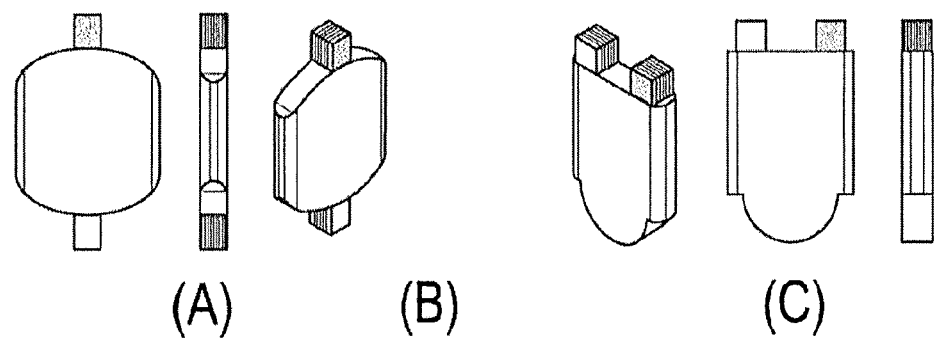
FIGS. 5(A)-5(C) schematically show different examples of asymmetrical electrode windings.

FIGS. 5(A)-5(C) illustrates further examples of asymmetrical electrode windings which can be produced in accordance with the method. The windings illustrated in FIGS. 5(A) and 5(B) have groups of negative and positive collectors on two opposite end faces. FIG. 5(C), however, illustrates a winding in which the positive and negative collector lugs protrude from the electrode winding at the same end face.

The invention claimed is:

1. A method of producing electrode windings comprising:
   (A) providing at least one strip or ribbon shaped anode,
   (B) forming flat negative collector lugs at varying distances on at least one longitudinal side of the at least one anode and/or cutting a contour into the at least one longitudinal side of the at least one anode,
   (C) providing at least one strip or ribbon shaped cathode,
   (D) forming flat positive collector lugs at varying distances on at least one longitudinal side of the at least one cathode and/or cutting a contour into the at least one longitudinal side of the at least one cathode,
   (E) providing at least one strip or ribbon shaped separator,
   (F) optionally, cutting a contour into at least one longitudinal side of the at least one separator, and
   (G) winding up the at least one anode, the at least one cathode and the at least one separator to form a winding with the sequence anode/separator/cathode,
   wherein (G) and at least one of (B) or (D) and, optionally, (F) overlap with respect to time, and wherein at least one of the parameters
      relative positioning of the positive collector lugs in relation to one another,
      relative positioning of the negative collector lugs in relation to one another,
      relative positioning of the positive collector lugs in relation to the negative collector lugs,
      relative positioning of the at least one cathode in relation to the at least one anode,
      relative positioning of the at least one separator in relation to the at least one cathode and/or in relation to the at least one anode,
      thickness and/or geometry of the at least one anode, in particular thickness and/or geometric profile of the at least one strip or ribbon shaped anode in the longitudinal direction,
      thickness and/or geometry of the at least one cathode, in particular thickness and/or geometric profile of the at least one strip or ribbon shaped cathode in the longitudinal direction, and
      thickness and/or geometry of the at least one separator, in particular thickness and/or geometric profile of the at least one strip or ribbon shaped separator in the longitudinal direction
   is detected by at least one sensor and, depending on a measurement result,
      the distances between the collector lugs which are still to be formed (B) and/or (D) are re-corrected and/or
      the contours to be cut for the longitudinal sides of the electrodes and/or of the at least one separator are re-corrected.

2. The method as claimed in claim 1, wherein formation of the positive and/or negative collector lugs comprises cutting with aid of a laser.

3. The method as claimed in claim 2, wherein the strip or ribbon shaped anode and the strip or ribbon shaped cathode are the electrodes of a battery cell or of a capacitor.

4. The method as claimed in claim 1, wherein the strip or ribbon shaped anode and the strip or ribbon shaped cathode are the electrodes of a battery cell or of a capacitor.

5. The method as claimed in claim 1, wherein formation of the positive and/or negative collector lugs comprises cutting with aid of a laser.

6. The method as claimed in claim 1, wherein the strip or ribbon shaped anode and the strip or ribbon shaped cathode are the electrodes of a battery cell or of a capacitor.

7. A device that carries out a method of producing electrode windings comprising:
   (A) providing at least one strip or ribbon shaped anode,
   (B) forming flat negative collector lugs at varying distances on at least one longitudinal side of the at least one anode and/or cutting a contour into the at least one longitudinal side of the at least one anode,
   (C) providing at least one strip or ribbon shaped cathode,
   (D) forming flat positive collector lugs at varying distances on at least one longitudinal side of the at least one cathode and/or cutting a contour into the at least one longitudinal side of the at least one cathode,
   (E) providing at least one strip or ribbon shaped separator,
   (F) optionally, cutting a contour into at least one longitudinal side of the at least one separator, and
   (G) winding up the at least one anode, the at least one cathode and the at least one separator to form a winding with the sequence anode/separator/cathode,
   wherein (G) and at least one of (B) or (D) and, optionally, (F) overlap with respect to time, the device comprising:
      means for providing at least one strip or ribbon shaped anode,
      means for forming flat negative collector lugs at varying distances on at least one longitudinal side of the at least one anode and/or means for cutting a contour into the at least one longitudinal side of the at least one anode,
      means for providing at least one strip or ribbon shaped cathode,
      means for forming flat positive collector lugs at varying distances on at least one longitudinal side of the at least one cathode and/or means for cutting a contour into the at least one longitudinal side of the at least one cathode,
      means for providing at least one strip or ribbon shaped separator, optionally, means for cutting a contour into at least one longitudinal side of the at least one separator, and means for winding up the at least one anode, the at least one cathode and the at least one separator to form a winding with the sequence anode/separator/cathode, at least one sensor that determines at least one of the parameters comprising relative positioning of the positive collector lugs in relation to one another, relative positioning of the negative collector lugs in relation to one another, relative positioning of the positive collector lugs in relation to the negative collector lugs, relative positioning of the at least one cathode in relation to the at least one anode, relative positioning of the at least one separator in relation to the at least one cathode and/or in relation to the at least one anode, thickness and/or geometries of the at least one anode, thickness and/or geometric profile of the at least one anode in the longitudinal direction, thickness and/or geometry of the at least one cathode, thickness and/or geometric profile of the at least one cathode in the longitudinal direction, and thickness and/or geometry of the at least one separator, thickness and/or geometric profile of the at least one separator in the longitudinal direction, and a data-processing and control device that detects measurement results of the at least one sensor and, depending on said measurement results, prespecifies, to the means for forming the flat collector lugs, distances or a variation in the distances between the collector lugs on the at least one longitudinal side of the at least one cathode and/or of the at least one anode and/or supplies a corrected prespecified contour value to the means for cutting the contour into the at least one longitudinal side of the at least one cathode, of the at least one anode and/or of the at least one separator.

\* \* \* \* \*